Dec. 17, 1929.  J. V. CUNNIFF ET AL  1,740,007
HEADLIGHT FOR MOTOR VEHICLES
Filed Feb. 8, 1928   2 Sheets-Sheet 1
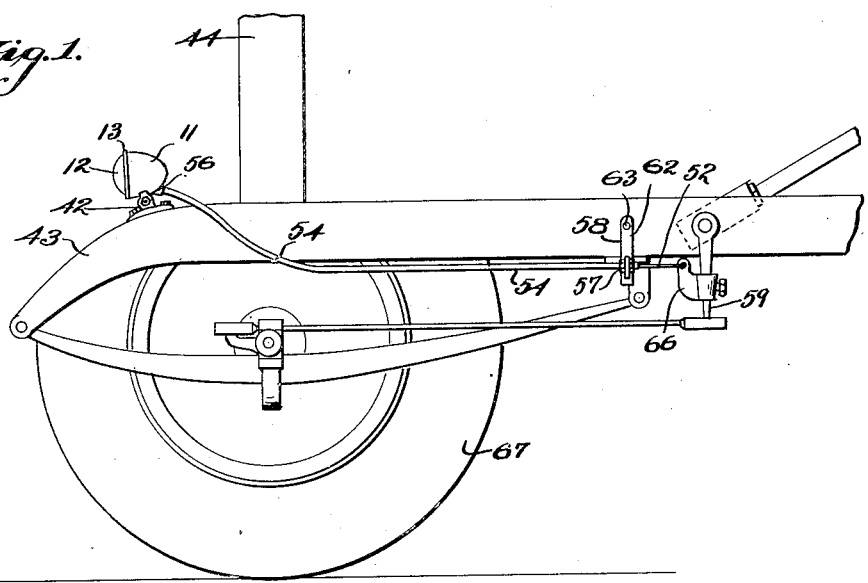
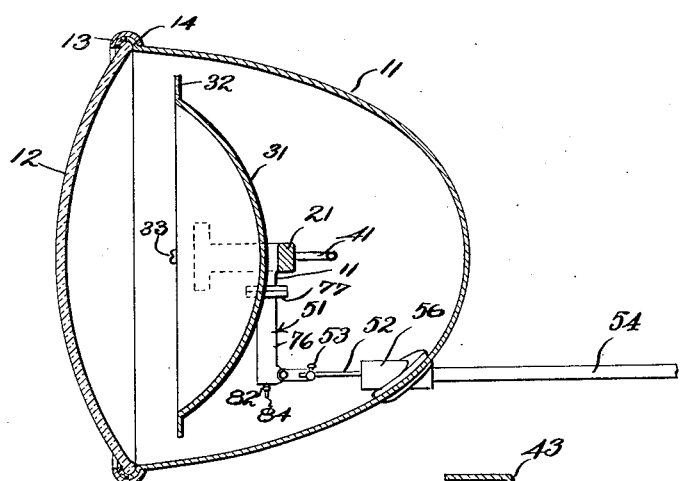
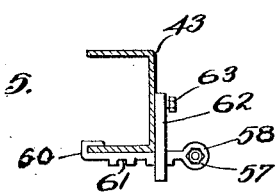
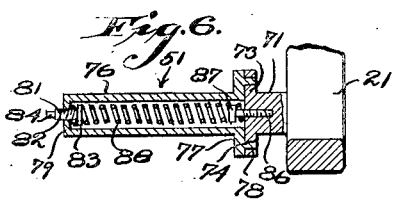
Inventor
J. V. Cunniff
J. A. Darsie
by Hazard and Miller
Attorneys Dec. 17, 1929.   J. V. CUNNIFF ET AL   1,740,007
HEADLIGHT FOR MOTOR VEHICLES
Filed Feb. 8, 1928   2 Sheets-Sheet 2
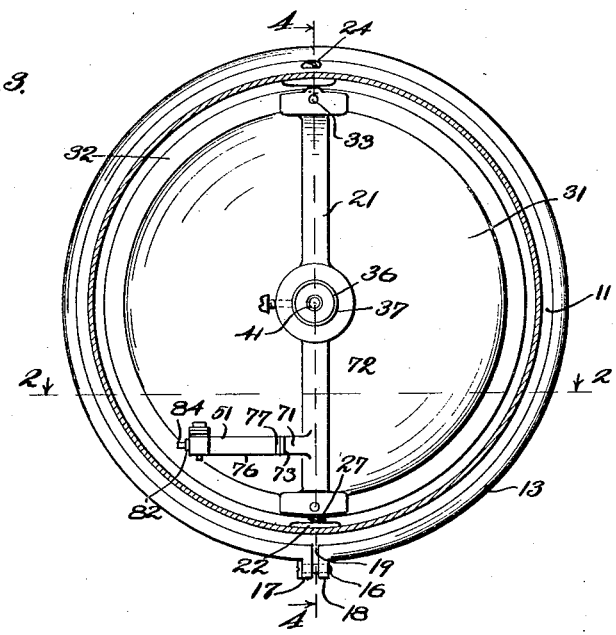
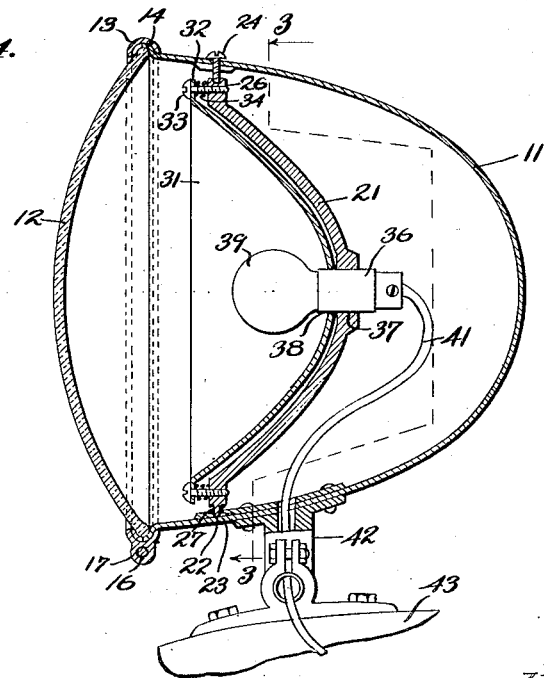

Patented Dec. 17, 1929

1,740,007

UNITED STATES PATENT OFFICE

JOHN V. CUNNIFF AND JAMES A. DARSIE, OF LOS ANGELES, CALIFORNIA; SAID DARSIE ASSIGNOR TO SAID CUNNIFF

HEADLIGHT FOR MOTOR VEHICLES

Application filed February 8, 1928. Serial No. 252,737.

This invention relates to vehicle headlights.

An object of the invention is the provision of a headlight adapted to direct a beam of light directly ahead when the vehicle upon which the headlight is mounted is following a straight path, and when the vehicle is turning to direct its beam in the direction towards which the vehicle is turning.

Another object is the provision of a headlight of the class described, in which the movement of the beam of light is effected by turning the reflector within the housing of the headlight.

A further object is the provision of a headlight as described, in which the reflector is operably connected to the pitman of the steering gear whereby movement of the reflector is effected by movement of the pitman.

With the foregoing and other objects in view which will be made manifest in the following detailed description and specifically pointed out in the appended claims, reference is had to the accompanying drawings for an illustrative embodiment of the invention, wherein:

Figure 1 is a side elevation of the forward portion of a motor vehicle with certain parts removed to show the manner of mounting our improved headlight thereon.

Fig. 2 is a horizontal, sectional view of the headlight proper, the plane of section being taken upon the line 2—2 of Fig. 3 in the direction indicated.

Fig. 3 is a compound, vertical, sectional view, the planes of section being taken upon the lines 3—3 of Fig. 4 in the direction indicated.

Fig. 4 is a vertical, longitudinal, medial view, the plane of section being taken upon the line 4—4 of Fig. 3 in the direction indicated.

Fig. 5 is an enlarged, detailed view showing the manner of mounting the flexible conduit upon the frame of the vehicle.

Fig. 6 is an enlarged, horizontal, sectional view of the arm carried by the reflector shell, for effecting movement thereof.

In its preferred embodiment, the headlight of our invention comprises a housing 11, having a lens 12 removably secured to the front thereof by means of a removable bezel 13, surrounding the periphery of the lens 12 and a bead 14 upon the forward edge of the housing 11. A screw 16 extends through one lug 17 and is threaded to another lug 18, these lugs being on opposite sides of a split 19 of the bezel, whereby the bezel may be removably clamped to retain the lens in position.

A shell 21 which is preferably substantially of parabolic shape, is mounted for pivotal movement within the housing 11. A pin 22 extends downwards from the bottom edge of the shell 21 and is received within a socket 23 upon the bottom of the housing 11. A screw 24 is threaded through the top of the housing 11 and seats within a socket 26 in the top edge of the shell 21. The screw 24 and socket 26 are diametrically opposed from the socket 23 and pin 22 upon the housing and shell respectively, so that pivotal movement of the shell about a vertical axis within the housing is possible. A coil spring 27 encircles the pin 22 and is interposed between the bottom of the shell 21 and the bottom of the housing 11, urging the shell 21 upwards against the screw 24. Not only does the spring 27 avoid rattling of the shell 21 within the housing 11, but it also provides a cushion to absorb shocks imparted to the shell 21 by the frame of the vehicle.

A reflector 31, preferably parabolic, is adapted to be received within the shell 21. Its edge 32 extends laterally of the reflector to provide a flange through which a plurality of screws 33 pass to be threaded into the edge of the shell 21; and a spring 34 upon each of the screws 33 between the reflector and shell, urges the reflector outwards of the shell so that the reflector may be adjusted relative to the shell by turning the screws 33. A socket 36 is rigid with the shell 21 extending through an aperture 37 at the rear thereof. This socket 36 extends loosely through an aperture 38 in the reflector 31, permitting movement of the reflector in respect to the shell; and an electric light bulb 39 is adapted to be received within the socket 36. An electric conductor 41 extends from the socket 36 out of the shell 11 through a bracket 42 by means of which the housing 11 is rigidly mounted upon the frame 43 of the vehicle 44.

An arm 51 is carried by the shell 21, and a piece of piano wire 52 or other suitable semi-rigid member is secured to the outer end of the arm 51 by a screw 53. The wire 52 is slidable within a flexible conduit 54 which is secured at one end 56 to the housing 11, and at the other end 57 by a bracket 58 to the frame 43 of the vehicle adjacent the pitman 59 forming a portion of the conventional steering gear. The bracket 58 is provided at one end with a hook 60 adapted to seat upon one edge of the channel of which the frame 43 is usually composed. A plurality of notches 61 are formed on the lower side of the bracket 58 within any one of which an arm 62 may be positioned; and a screw 63 threaded through the arm 62 may be tightened against the side of the frame 43 to retain the bracket 58 in position. The wire 52 extends through the conduit 54 and is secured to a bracket 66 adjustably secured upon the pitman 59. Thus it may be seen that when the front wheels 67 of the vehicle 44 are turned upon their respective steering knuckles by means of the pitman 59, the wire 52 will be slid through the conduit 54; and since the wire is connected to the arm 51, the shell 21 and reflector 31 will be rotated through an arc proportional to the amount of movement of the pitman 59. The proportionate size and arrangement of the parts is such that when the wheels 67 are turned to direct the vehicle to the right, the shell and reflector are also turned to the right a distance suitable to properly illuminate that portion of the road into which the vehicle is being directed.

It is desirable to design the arm 51 by means of which the wire 52 is connected to the shell 21, so that movement of the wire 52 in respect to the shell 21 may take place in the event that the shell were to become jammed in any way. For this purpose, we form the arm 51 in two parts normally held rigid by spring tension, but which are capable of being displaced in respect to each other when a force of sufficient magnitude is exerted against one of them. A projection 71 preferably integral with the shell 21 and extending laterally from one side thereof, is provided with an enlarged head 73 having a plurality of apertures 74 therethrough. The major portion of the arm 51 comprises a tube 76 having a flange 77 at its inner end from which a plurality of projections 78 extend, each of these projections being adapted to be seated loosely in one of the apertures 74. The other end of the tube 76 is closed by an inwardly extending flange 79, the central aperture 81 of which is threaded to receive a screw 82 provided with a head 83. Since the screw 82 is to be positioned with its head inside the tube 76, the other end of the screw 82 is provided with a squared wrench-receiving portion 84, the largest diameter of which is smaller than the root diameter of the screw 82. A screw 86 having a similar flat head 87, is threaded into the projection 71 so that its head 87 may be contained within the tube 76. A coil spring 88 is placed under tension between the screws 82 and 86, by engaging the ends of the spring 88 upon one of the heads 83 and 87 of the screws 82 and 86 respectively. It is to be understood of course, that any convenient means for attaching the spring to the screws may be employed; the type described being preferred merely because of its simplicity and ease of attaching the spring to the screw heads. The spring 88 may be attached to the screw 82 first, and then by stretching the spring, the other end attached to the screw 86, after which the tube 76 may be placed upon the projection 71 with the projections 78 seated within the apertures 74. Then a suitable degree of tension may be imposed upon the spring 88 by turning the screw 82 so that it will be necessary to exert a force of considerable magnitude before the tube 76 will pivot in respect to the projection 71 upon the shell 21. This pivotal movement of course, is resisted by the spring 88, so that when the force causing the displacement of the arm has been relieved, the spring will cause the arm to again be seated in alignment with the projection 71.

Various changes in the detail of construction may be made without departing from the spirit and scope of the invention as defined by the appended claims.

We claim:

1. In a vehicle headlight, a housing, means for rigidly mounting said housing upon a vehicle, a concave shell, axial aligned pins pivotally supporting said shell, a reflector disposed within the concave portion of said shell, said reflector having a flange overlying the periphery of said shell, headed screws extending through apertures in the flange and threaded into said shell, a spring disposed upon each of said screws and under compression between said shell and reflector flange urging said reflector outward of said shell against the heads of the screws, a socket rigid with said shell and extending loosely through an aperture in said reflector, to support a lamp bulb adjacent the focal point of the reflector, and means for turning said shell about the axis of said pins.

2. In a vehicle headlight, a housing, means for rigidly mounting said housing upon a vehicle, a concave shell, axially aligned pins pivotally supporting said shell, a reflector disposed within the concave portion of said shell, a socket carried by said shell and adapted to position a lamp bulb adjacent the focal point of said reflector, an arm pivoted to said shell for movement in respect thereto in a plane to which the axis of said pins is perpendicular, resilient means normally holding said arm fixed in respect to said shell, and means attached to said arm for imparting rotary movement thereto to turn the shell within the housing.

3. In a vehicle headlight, a housing, means for rigidly mounting said housing upon a vehicle, a concave shell, axially aligned pins pivotally supporting said shell, a reflector disposed within the concave portion of said shell, a socket carried by said shell and adapted to position a lamp bulb adjacent the focal point of said reflector, a projection rigid with said shell, an arm mounted for pivotal movement upon said projection, spring means interposed between said arm and said projection normally holding them in alignment, and means attached to said arm for imparting rotary movement thereto to turn the shell within the housing.

4. In a light projector, a shell, means for pivotally mounting said shell upon a supporting structure, a light source disposed within said shell, a projection rigid with said shell, an arm mounted on said projection for pivotal movement in respect thereto in a plane to which the axis of rotation of the shell is perpendicular, spring means interposed between said arm and projection normally holding them in alignment, and means attached to said arm for imparting rotary movement thereto to turn the shell in respect to the supporting structure.

5. In a light projector, a shell, means for pivotally mounting said shell upon a supporting structure, a light source disposed within said shell, a projection rigid with said shell, a hollow arm, a spring disposed therein and under tension between the arm and the projection to normally hold them in abutment and in alignment, and means attached to the outer end of said arm for imparting rotary movement thereto.

6. In a light projector, a shell, means for pivotally mounting said shell upon a supporting structure, a light source disposed within said shell, a projection rigid with said shell, a hollow arm, a screw threaded through the outer end of said arm and accessible from the exterior thereof, a spring inside said arm and under tension between the inner end of said screw and said projection, said spring normally holding said arm and projection in abutment and in alignment, and means attached to the outer end of said arm for imparting rotary movement thereto.

In testimony whereof we have signed our names to this specification.

JOHN V. CUNNIFF.
JAMES A. DARSIE.